(12) United States Patent
Kang et al.

(10) Patent No.: US 8,941,913 B2
(45) Date of Patent: Jan. 27, 2015

(54) INFRARED OPTICAL LENS SYSTEM

(75) Inventors: Mi-won Kang, Changwon (KR); Byoung-guy Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 123 days.

(21) Appl. No.: 13/289,009

(22) Filed: Nov. 4, 2011

(65) Prior Publication Data

US 2012/0229892 A1    Sep. 13, 2012

(30) Foreign Application Priority Data

Mar. 9, 2011  (KR) .................. 10-2011-0021048

(51) Int. Cl.
*G02B 13/14* (2006.01)
*G02B 9/10* (2006.01)

(52) U.S. Cl.
CPC . *G02B 13/14* (2013.01); *G02B 9/10* (2013.01)
USPC ........................................................ 359/356

(58) Field of Classification Search
CPC .................. G02B 13/14–13/146; G02B 13/18
USPC ......... 359/350, 355–357, 362, 342, 708–719, 359/781–783
See application file for complete search history.

(56) References Cited

U.S. PATENT DOCUMENTS

| | | | | |
|---|---|---|---|---|
| 4,834,472 A | * | 5/1989 | Palmer | 359/356 |
| 6,011,660 A | * | 1/2000 | Nagahara | 359/793 |
| 6,665,116 B1 | * | 12/2003 | Harvey et al. | 359/355 |
| 6,980,375 B2 | * | 12/2005 | Nagaoka | 359/736 |
| 6,999,243 B2 | * | 2/2006 | Chipper | 359/356 |
| 7,035,018 B2 | * | 4/2006 | Yamakawa | 359/691 |
| 7,672,045 B2 | | 3/2010 | Baker | |
| 8,072,697 B1 | * | 12/2011 | Shih et al. | 359/795 |
| 2005/0036217 A1 | * | 2/2005 | Nozawa | 359/793 |
| 2008/0030875 A1 | * | 2/2008 | Nishizawa | 359/717 |
| 2009/0052018 A1 | * | 2/2009 | Baker | 359/356 |
| 2009/0067041 A1 | * | 3/2009 | Izumi | 359/356 |
| 2009/0168153 A1 | * | 7/2009 | Hiraiwa et al. | 359/356 |
| 2010/0053778 A1 | * | 3/2010 | Saito | 359/795 |
| 2010/0165455 A1 | | 7/2010 | Baker | |
| 2010/0232013 A1 | * | 9/2010 | Yin et al. | 359/356 |
| 2011/0115965 A1 | * | 5/2011 | Engelhardt et al. | 359/772 |
| 2012/0120504 A1 | * | 5/2012 | Shih et al. | 359/717 |
| 2013/0271852 A1 | * | 10/2013 | Schuster | 359/717 |

FOREIGN PATENT DOCUMENTS

JP      2003295052 A    10/2003
KR      10-0838662 A    4/2008

* cited by examiner

*Primary Examiner* — Stephone B Allen
*Assistant Examiner* — Jeffrey Madonna
(74) *Attorney, Agent, or Firm* — Sughrue Mion, PLLC (57) ABSTRACT

Provided is an infrared optical lens system including: a first lens having negative refractive power; and a second lens having positive refractive power, wherein the first lens and the second lens are disposed in this order from an object side to an image side.

17 Claims, 12 Drawing Sheets

LONGITUDINAL SPHERICAL ABERRATION

FIG. 5B

ASTIGMATISM

FIG. 5C

DISTORTION

LONGITUDINAL SPHERICAL ABERRATION

FIG. 11B

ASTIGMATISM

FIG. 11C

DISTORTION

INFRARED OPTICAL LENS SYSTEM

CROSS-REFERENCE TO RELATED PATENT APPLICATION

This application claims priority from Korean Patent Application No. 10-2011-0021048, filed on Mar. 9, 2011, in the Korean Intellectual Property Office, the disclosure of which is incorporated herein in its entirety by reference.

BACKGROUND

1. Field

Apparatuses consistent with exemplary embodiments relate to infrared optical lens systems.

2. Description of the Related Art

Objects at temperature above absolute zero (0° K) irradiate infrared rays. Thus, infrared monitoring camera systems, which detect infrared rays, are used in various fields. For example, infrared monitoring camera systems can be used in monitoring fire, which may break out in large factories or on mountains, or in preventing the spread of contagious diseases by checking temperature of, for example, people suspected of being infected with influenza. Infrared monitoring camera systems may also be manufactured for military purposes and used in monitoring border areas.

As infrared monitoring camera systems are used in various fields, demands for compact and high performance infrared optical lens systems are gradually increasing.

SUMMARY

One or more exemplary embodiments provide high performance infrared optical lens systems having a small number of lenses.

According to an aspect of an exemplary embodiment, there is provided an infrared optical lens system comprising: a first lens having negative refractive power; and a second lens having positive refractive power, wherein the first lens and the second lens are disposed in this order from an object side to an image side.

In the infrared optical lens system, at least two aspheric surfaces may be provided on at least one of the first lens and the second lens.

The first lens may comprise at least one aspheric surface, and the second lens comprises at least one aspheric surface.

The first lens may comprise one aspheric surface, and the second lens comprises one aspheric surface.

A surface of the first lens facing the image side and a surface of the second lens facing the object side may be aspheric surfaces.

In the infrared optical lens system, only one aspheric surface may be provided on the first lens and the second lens.

A surface of the first lens facing the image side may be an aspheric surface.

An effective focal length of the infrared optical lens system may be 20 mm or less.

The effective focal length of the infrared optical lens system may be 14 mm or less.

An F-number of the infrared optical lens system may be 1.4 or less.

A back focal length of the infrared optical lens system may be 15 mm or greater.

The back focal length of the infrared optical lens system may be 20 mm or greater.

A field of view of the infrared optical lens system may be 30° or greater.

The field of view of the infrared optical lens system may be 40° or greater.

The first lens may be a negative meniscus lens having a convex surface facing the image side.

The second lens may be a bi-convex lens.

The second lens may be a positive meniscus lens having a convex surface facing the object side.

The second lens may be a positive meniscus lens having a convex surface facing the image side.

The first lens and the second lens may comprise a same material.

The infrared optical lens system may further comprise an aperture disposed between the first lens and the second lens.

BRIEF DESCRIPTION OF DRAWINGS

The above and other aspects will become more apparent by describing in detail exemplary embodiments thereof with reference to the attached drawings in which.

DETAILED DESCRIPTION OF EXEMPLARY EMBODIMENTS

Hereinafter, exemplary embodiments will be described more fully with reference to the accompanying drawings. The inventive concept may, however, be embodied in many different forms and should not be construed as being limited to the exemplary embodiments set forth herein; rather, these exemplary embodiments are provided so that this disclosure will be thorough and complete, and will fully convey the inventive concept to those skilled in the art. Unless defined otherwise, technical and scientific terms used herein have the same meaning as is commonly understood by one of skill in the art to which this inventive concept belongs. An expression used in the singular encompasses the expression of the plural, unless it has a clearly different meaning in the context. Also, it is to be understood that the terms such as "comprise" and/or "comprising" are intended to indicate the existence of the features, numbers, steps, actions, components, parts, or combinations thereof, and are not intended to preclude the possibility that one or more other features, numbers, steps, actions, components, parts, or combinations thereof may exist or may be added. Terms such as first, second, etc. may be used to describe various elements, but these terms do not limit elements and are used only to classify one element from another.

FIGS. 1, 4, 7, and 10 respectively illustrate an infrared optical lens system according to exemplary embodiments.

Referring to FIGS. 1, 4, 7, and 10, the infrared lens system includes a first lens 10 and a second lens 20 in this order from an object side O to an image side I. The first lens 10 has negative refractive power. The first lens 10 may be a meniscus lens having a convex surface S2 facing the image side I. The second lens 20 has positive refractive power. The second lens 20 may be a bi-convex lens, a meniscus lens having a convex surface S4 facing the image side I, or a meniscus lens having a convex surface S3 facing the object side O.

The first lens 10 and the second lens 20 may be formed of the same material. For example, the first and second lenses 10 and 20 may comprise germanium. Germanium is a highly refractive material, from among materials through which infrared rays can be transmitted, and can be used in minimizing an overall length of an infrared optical lens system.

An aperture ST may be disposed between the first lens 10 and the second lens 20.

The infrared optical lens system may include aspheric surfaces. As the infrared optical lens system includes aspheric surfaces, chromatic aberration may be minimized. If the first lens 10 and the second lens 20 are formed of different materials, it is easy to adjust chromatic aberration of the infrared optical lens system but the overall length is increased. However, as the infrared optical lens system according to the exemplary embodiments includes aspheric surfaces, chromatic aberration, which may be a problem when the first and second lenses 10 and 20 are formed of the same material, may be minimized.

The infrared optical lens system may include at least two aspheric surfaces. For example, the infrared optical lens system illustrated in FIGS. 1, 4, and 10 includes two aspheric surfaces. The first lens 10 and the second lens 20 may each include an aspheric surface. For example, the surface S2 of the first lens 10 facing the image side I and the surface S3 of the second lens 20 facing the object side O may be aspheric surfaces. As the first lens 10 and the second lens 20 each include an aspheric surface respectively rather than either one of the first lens 10 or the second lens 20 includes two aspheric surfaces on its both sides, eccentricity in which centers of the surfaces do not correspond to each other, which results in manufacturing tolerance, may be effectively prevented.

Also, as the aspheric surfaces are the surface S2 of the first lens 10 facing the image side I and the surface S3 of the second lens 20 facing the object side O, the aspheric surfaces are not exposed to the outside, and this allows coating such as diamond-like carbon (DLC) coating to be easily conducted.

Figure 4:
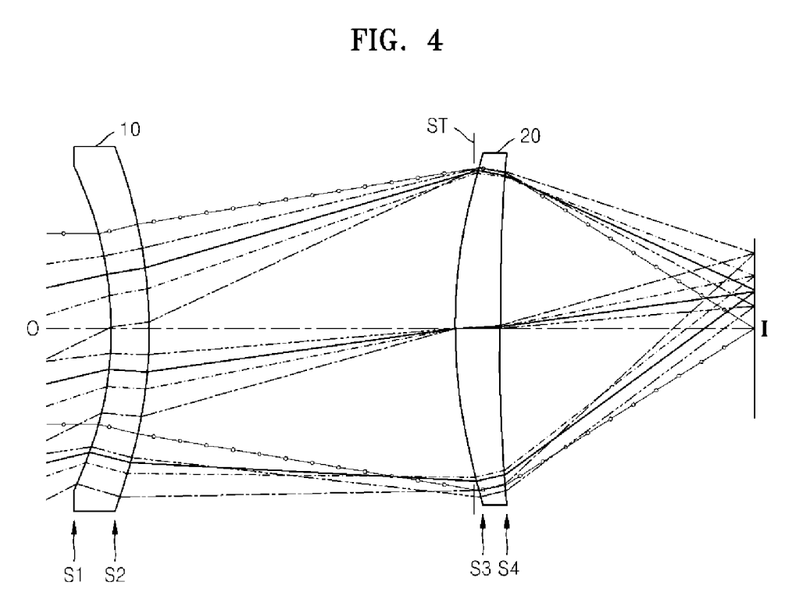
FIG. 4 is a schematic perspective view illustrating an infrared optical lens system according to another exemplary embodiment.

The infrared optical lens system illustrated in FIG. 4 may include one aspheric surface. For example, the surface S2 of the first lens 10 facing the image side I may be the aspheric surface.

The infrared optical lens system including one or two aspheric surfaces as described above may minimize deviation in optical performance caused when the first lens 10 and the second lens 20 thermally expand due to a change in an external temperature. The more the number of aspheric surfaces, the easier it is to correct chromatic aberration but also the greater the manufacturing costs and deviation in the optical performance due to thermal expansion. However, the infrared optical lens system according to the current exemplary embodiments including one or two aspheric surfaces may correct chromatic aberration and minimize deviation in optical performance due to thermal expansion at the same time.

The infrared optical lens system according to exemplary embodiments may satisfy the following expressions.

$$EFL \leq 20 \text{ mm} \quad (1)$$

$$FOV \geq 30° \quad (2)$$

EFL denotes an effective focal length of the infrared optical lens system, and FOV denotes a field of view of the infrared optical lens system.

Expression (1) represents the EFL of the infrared optical lens system. In detail, the EFL may be 14 mm or smaller. Meanwhile, Expression (2) represents the FOV of the infrared optical lens system. In detail, the FOV may be 40° or greater. According to an exemplary embodiment, a wide angle may be formed by using only two lenses.

Also, the infrared optical lens system may satisfy the following expression.

$$BFL \geq 15 \text{ mm} \quad (3)$$

Here, BFL denotes a back focal length of the infrared optical lens system. BFL denotes the distance from the last surface of the infrared optical lens system to the second focal point of the infrared optical lens system, and the second focal point of the infrared optical lens system denotes an image plane. In detail, the BFL may be 20 mm or greater. According to an exemplary embodiment, by having a long BFL, a sufficient space for installing a shutter that is included in order to prevent saturation of a sensor may be provided.

An F-number of the infrared optical lens system according to an exemplary embodiment may be 1.4 or smaller.

The aspheric surfaces described above may be defined as follows.

When an optical axis lies in an x-direction, and a direction perpendicular to the optical axis is a y-direction, an aspheric shape of a lens of the infrared optical lens system according to an exemplary embodiment may be represented by an equation below, wherein a proceeding direction of a beam is positive. Here, x(y) denotes a distance of a surface of the lens from the vertex, at distance y from the optical axis, y denotes a distance from the optical axis, $a_4$, $a_6$, $a_8$, $a_{10}$, and $a_{14}$ each denote an aspheric coefficient, and c denotes an inverse number (1/R) of a radius of curvature at the vertex of the lens.

$$x(y) = \frac{cy^2}{1 + \sqrt{1 - (1+k)c^2 y^2}} + a_4 y^4 + a_6 y^6 + a_8 y^8 + a_{10} y^{10} + a_{14} y^{14}$$

Design data of the infrared optical lens system according to the current exemplary embodiment will now be described.

Hereinafter, R denotes a radius of curvature, and Dn denotes a thickness at a center of a lens or an interval between lenses.

<First Embodiment>

Figure 1:
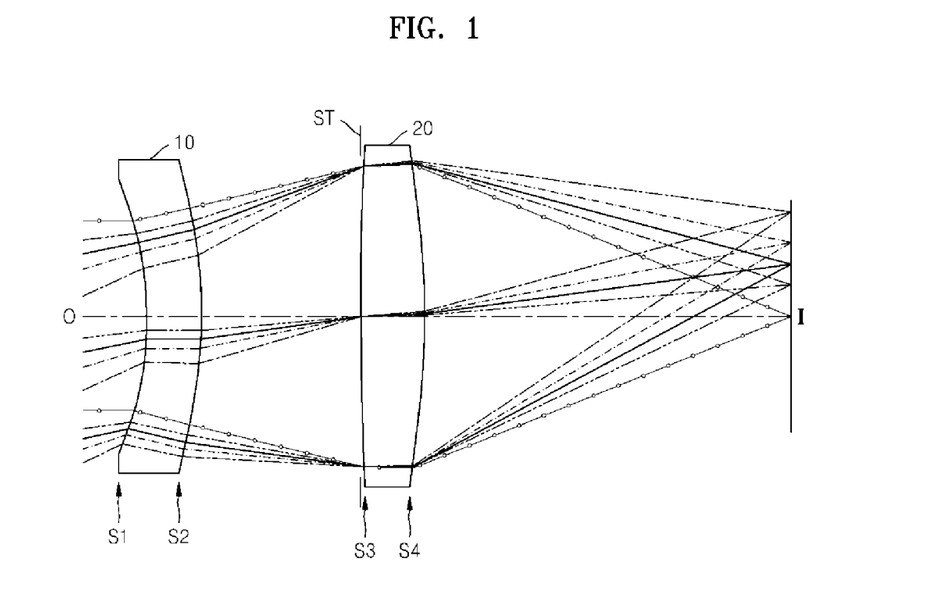
FIG. 1 is a schematic perspective view illustrating an infrared optical lens system according to an exemplary embodiment.

Table 1 shows design data of the infrared optical lens system according to the exemplary embodiment illustrated in FIG. 1, and Table 2 shows aspheric coefficients of the infrared optical lens system illustrated in FIG. 1. In the current exemplary embodiment, the first lens 10 is a negative meniscus lens having a convex surface facing an image side I, and the second lens 20 is a bi-convex lens.

EFL=13.9999
BFL=20.2806
Fno=1.4
FOV=47.1°

TABLE 1

| # | R | Dn | material |
|---|---|---|---|
| S1 | −17.6482 | 3 | germanium |
| S2 | −24.0282 | 8.251 | air |
| S3 as stop | 188.6116 | 3.5 | germanium |
| S4 | −50.8047 | 20 | air |

TABLE 2

| # | $a_4$ | $a_6$ | $a_8$ | $a_{10}$ | $a_{12}$ |
|---|---|---|---|---|---|
| S2 | 2.4619e−005 | 4.2986e−008 | 1.8125e−010 | 0 | 0 |
| S3 | −3.1673e−006 | −7.0803e−008 | 3.6821e−011 | 0 | 0 |

FIGS. 2A through 2C and 3A through 3E illustrate aberrations of the infrared optical lens system illustrated in FIG. 1, according to exemplary embodiments.

Figure 2A:
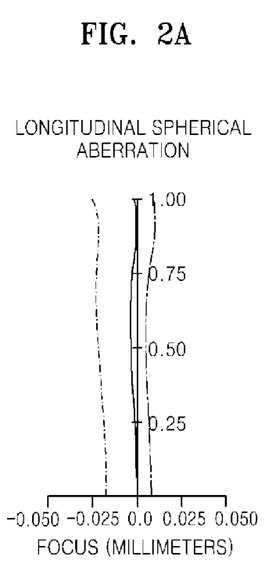
FIGS. 2A to 2C illustrate longitudinal spherical aberration, astigmatism, and distortion of the infrared optical lens system of FIG. 1, according to exemplary embodiments.
Figure 2B:
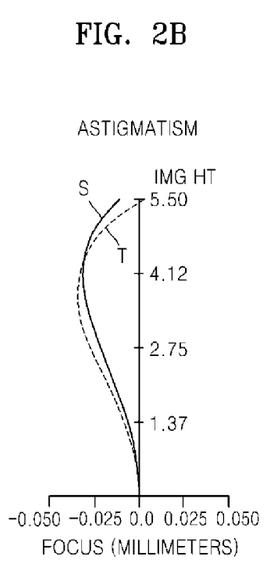
Figure 2C:
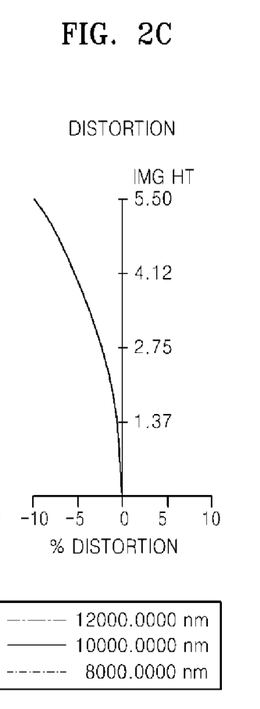
Figure 3A:
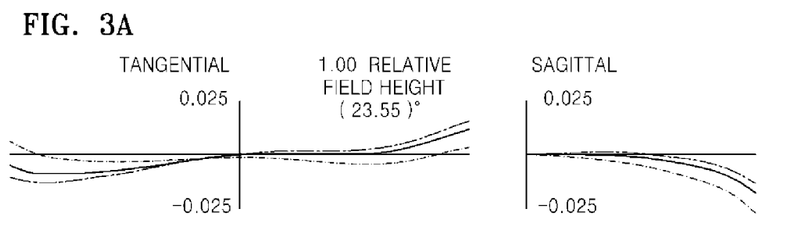
FIGS. 3A to 3E illustrate comatic aberrations of fields of the infrared optical lens system illustrated in FIG. 1, according to exemplary embodiments.
Figure 3B:
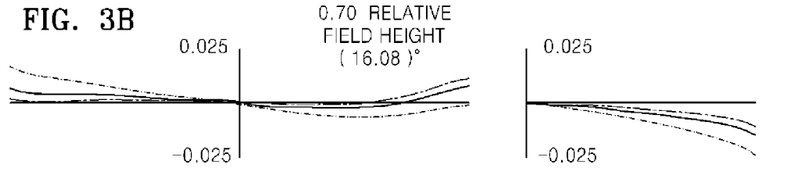
Figure 3C:
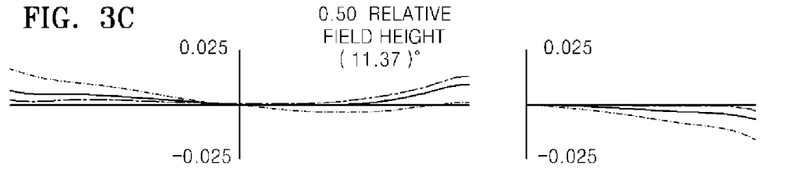
Figure 3D:
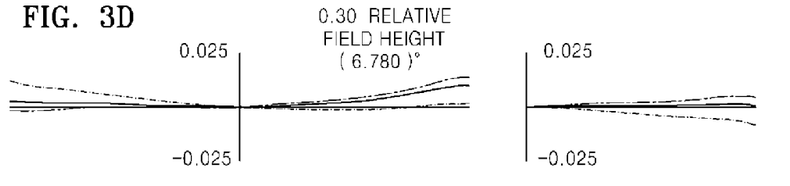
Figure 3E:
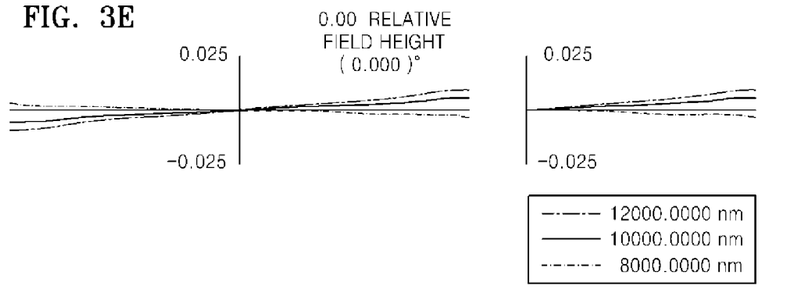

FIGS. 2A through 2C respectively illustrate longitudinal spherical aberration, astigmatism, and distortion of the infrared optical lens system of FIG. 1. In an astigmatic field curve, a dotted line denotes tangential astigmatic aberration, and a solid line denotes sagittal astigmatic aberration.

FIGS. 3A through 3E illustrate comatic aberrations of fields of the infrared optical lens system illustrated in FIG. 1, from a center (0 field) to a periphery (1 field) of an image sensor. In each of FIGS. 3A through 3E, a left graph shows tangential comatic aberration, and a right graph shows sagittal comatic aberration. The illustrated comatic aberrations correspond to when angles of light incident on the infrared optical lens system are 23.55°, 16.08°, 11.37°, 6.78°, and 0°.

Meanwhile, the aberrations illustrated in FIG. 2A and FIGS. 3A through 3E correspond to when wavelengths are 12000 nm, 10000 nm, and 8000 nm, and the aberrations illustrated in FIGS. 2B and 2C correspond to when a wavelength is 10000 nm.

<Second Embodiment>

Table 3 shows design data of the infrared optical lens system according to the exemplary embodiment illustrated in FIG. 4, and Table 4 shows aspheric coefficients of the infrared optical lens system illustrated in FIG. 4. In the current exemplary embodiment, the first lens 10 is a negative meniscus lens having a convex surface S2 facing an image side I, and the second lens 20 is a positive meniscus lens having a convex surface S3 facing an object side O.

EFL=13.9999
BFL=20.2355
Fno=1.0
FOV=47.94°

TABLE 3

| # | R | Dn | material |
|---|---|---|---|
| S1 | −25.2146 | 3 | germanium |
| S2 | −31.2938 | 22.488 | air |
| S3 as stop | 38.4728 | 3.5 | germanium |
| S4 | 130.5739 | 20 | air |

TABLE 4

| # | $a_4$ | $a_6$ | $a_8$ | $a_{10}$ | $a_{12}$ |
|---|---|---|---|---|---|
| S2 | 3.42153e−006 | 2.3529e−009 | 5.16747e−012 | 0 | 0 |
| S3 | 1.56296e−007 | −1.06486e−009 | −1.08824e−012 | 0 | 0 |

FIGS. 5A through 5C and FIGS. 6A through 6E illustrate aberrations of the infrared optical lens system illustrated in FIG. 4.

Figure 5A:
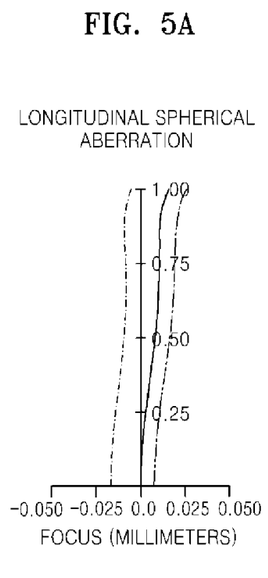
FIGS. 5A through 5C illustrate longitudinal spherical aberration, astigmatism, and distortion of the infrared optical lens system of FIG. 4, according to exemplary embodiments.
Figure 5B:
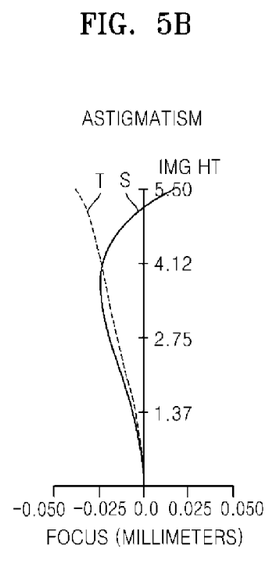
Figure 5C:
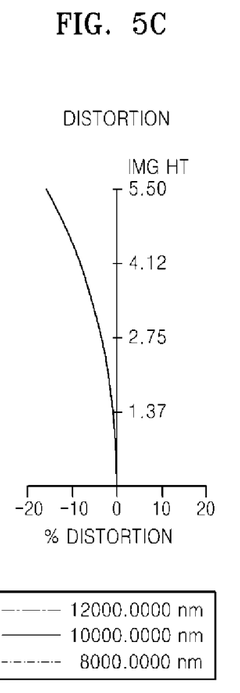
Figure 6A:
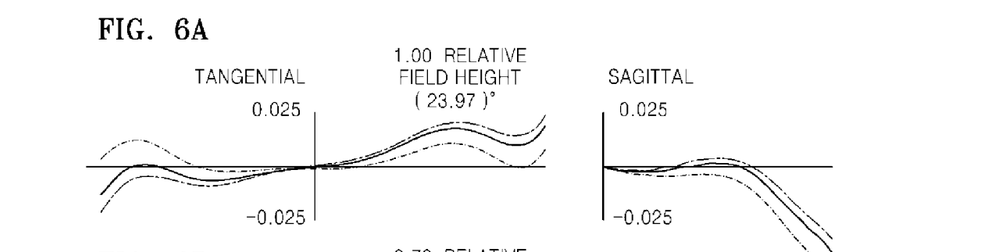
FIGS. 6A through 6E illustrate comatic aberrations of fields of the infrared optical lens system illustrated in FIG. 4, according to exemplary embodiments.
Figure 6B:
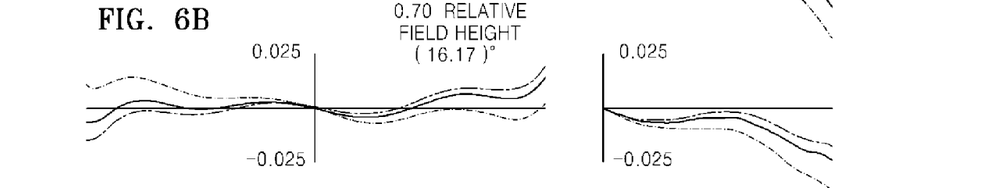
Figure 6C:
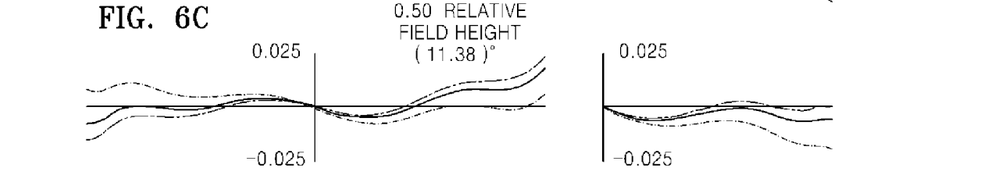
Figure 6D:
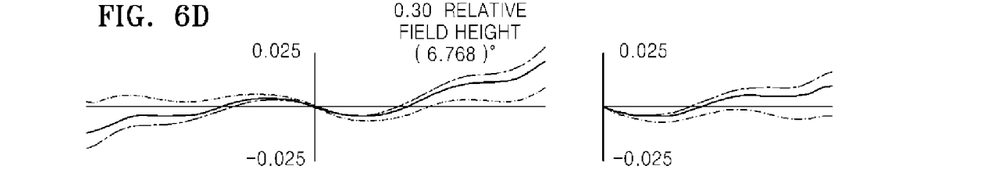
Figure 6E:
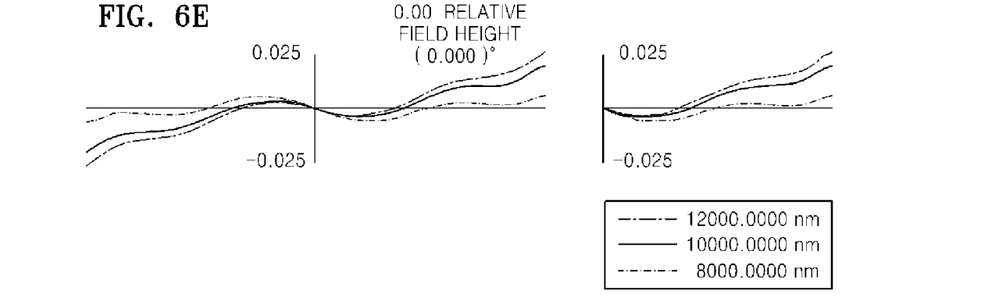

FIGS. 5A through 5C respectively illustrate longitudinal spherical aberration, astigmatism, and distortion of the infrared optical lens system of FIG. 4. In an astigmatic field curve, a dotted line denotes tangential astigmatic aberration, and a solid line denotes sagittal astigmatic aberration.

FIGS. 6A through 6E illustrate comatic aberrations of fields of the infrared optical lens system illustrated in FIG. 1, from a center (0 field) to a periphery (1 field) of an image sensor. In each of FIGS. 6A through 6E, a left graph shows tangential comatic aberration, and a right graph shows sagittal comatic aberration. The illustrated comatic aberrations correspond to when angles of light incident on the infrared optical lens system are 23.97°, 16.17°, 11.38°, 6.768°, and 0°.

Meanwhile, the aberrations illustrated in FIG. 5A and FIGS. 6A through 6E correspond to when wavelengths are 12000 nm, 10000 nm, and 8000 nm, and the aberration illustrated in FIGS. 5B and 5C correspond to when a wavelength is 10000 nm.

<Third Embodiment>

Figure 7:
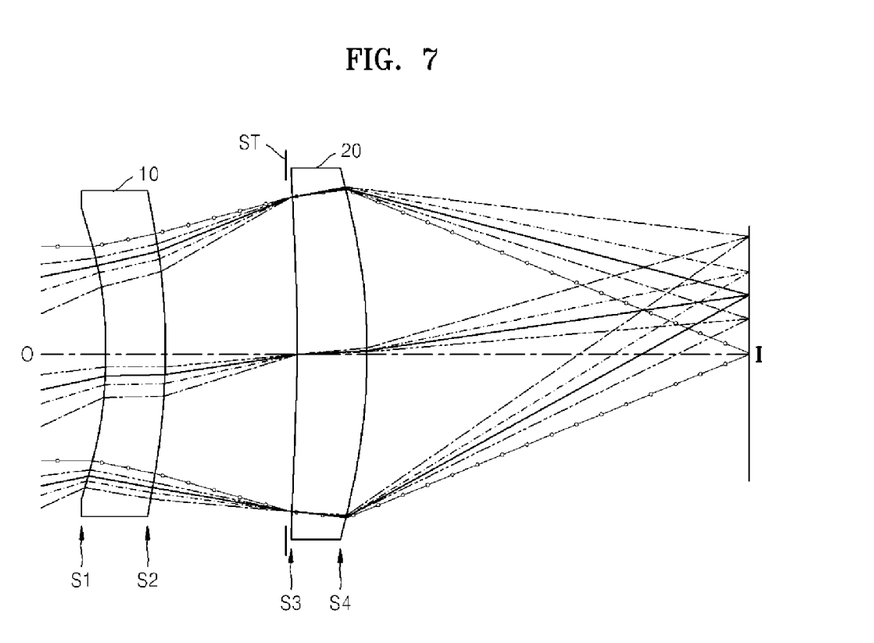
FIG. 7 is a schematic perspective view illustrating an infrared optical lens system according to another exemplary embodiment.

Table 5 shows design data of the infrared optical lens system according to the exemplary embodiment illustrated in FIG. 7, and Table 6 shows aspheric coefficients of the infrared optical lens system illustrated in FIG. 7. In the current exemplary embodiment, the first lens 10 is a negative meniscus lens having a convex surface S2 facing an image side I, and the second lens 20 is a positive meniscus lens having a convex surface S4 facing the image side I.

EFL=14.000
BFL=20.000
Fno=1.4
FOV=46.34°

TABLE 5

| # | R | Dn | material |
|---|---|---|---|
| S1 | −19.4672 | 3 | germanium |
| S2 | −26.7992 | 5.32 | air |
| S3 as stop | −103.6827 | 3.5 | germanium |
| S4 | −29.4645 | 20 | air |

TABLE 6

| # | $a_4$ | $a_6$ | $a_8$ | $a_{10}$ | $a_{12}$ |
|---|---|---|---|---|---|
| S2 | 3.9798e−005 | 2.1566e−008 | 1.6065e−008 | 0 | 0 |

FIGS. 8A through 8C and 9A through 9E illustrate aberrations of the infrared optical lens system illustrated in FIG. 7.

Figure 8A:
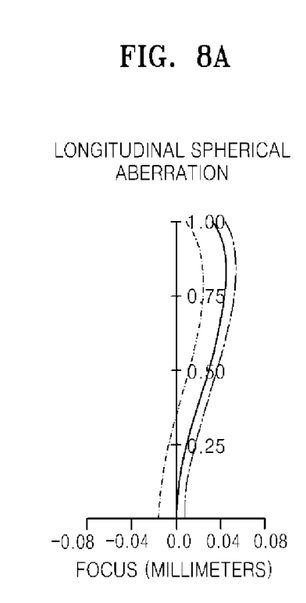
FIGS. 8A through 8C illustrate longitudinal spherical aberration, astigmatism, and distortion of the infrared optical lens system of FIG. 7, according to exemplary embodiments.
Figure 8B:
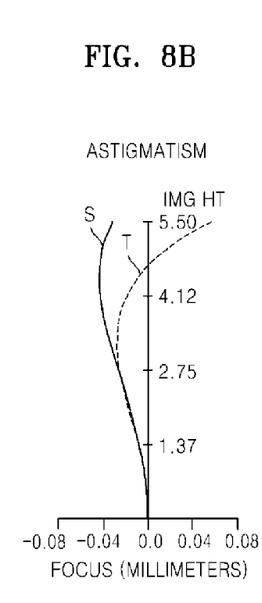
Figure 8C:
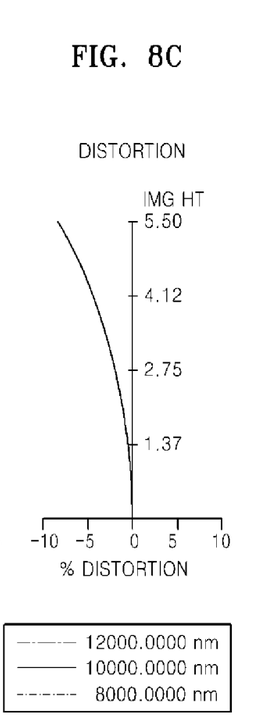
Figure 9A:
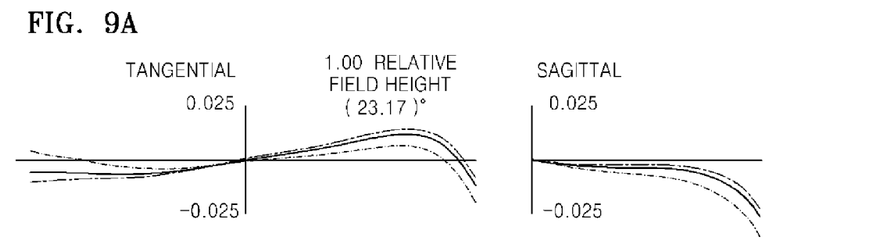
FIGS. 9A through 9E illustrate comatic aberrations of fields of the infrared optical lens system illustrated in FIG. 7, according to exemplary embodiments.
Figure 9B:
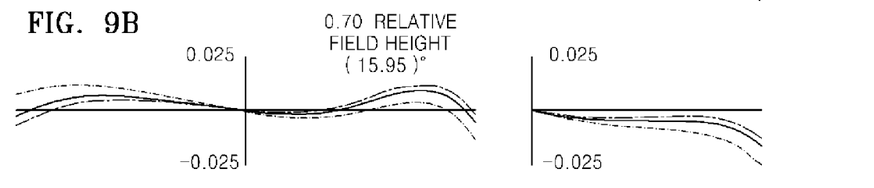
Figure 9C:
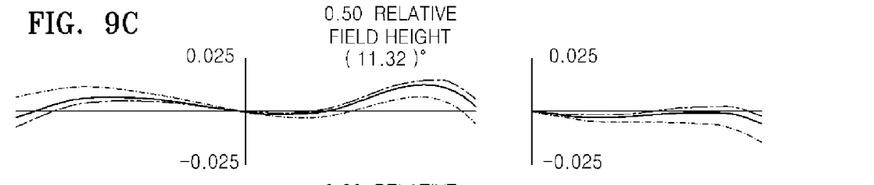
Figure 9D:
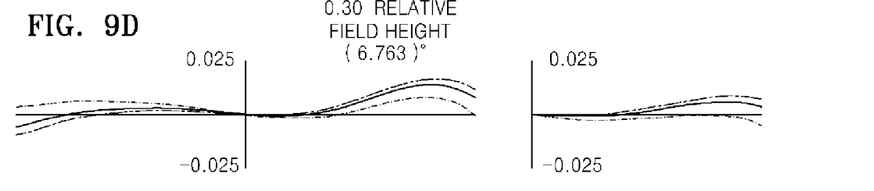
Figure 9E:
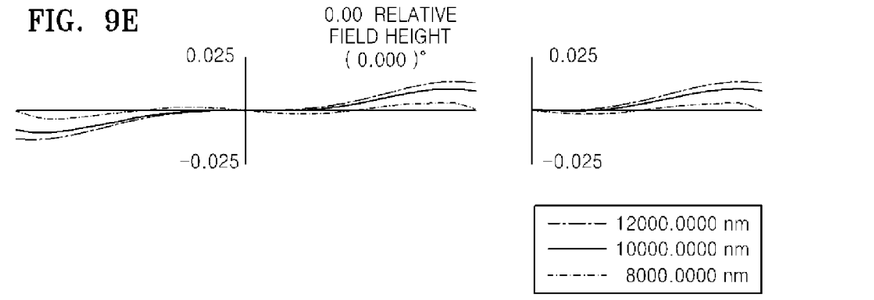

FIGS. 8A through 8C illustrate longitudinal spherical aberration, astigmatism, and distortion of the infrared optical lens system of FIG. 7. In an astigmatic field curve, a dotted line denotes tangential astigmatic aberration, and a solid line denotes sagittal astigmatic aberration.

FIGS. 9A through 9E illustrate comatic aberrations of fields of the infrared optical lens system illustrated in FIG. 1, from a center (0 field) to a periphery (1 field) of an image sensor. In each of FIGS. 9A through 9E, a left graph shows tangential comatic aberration, and a right graph shows sagittal comatic aberration. The illustrated comatic aberrations correspond to when angles of light incident on the infrared optical lens system are 23.17°, 15.95°, 11.32°, 6.763°, and 0°.

Meanwhile, the aberrations illustrated in FIG. 8A and FIGS. 9A through 9E correspond to when wavelengths are 12000 nm, 10000 nm, and 8000 nm, and the aberrations illustrated in FIGS. 8B and 8C correspond to when a wavelength is 10000 nm.

<Fourth Embodiment>

Figure 10:
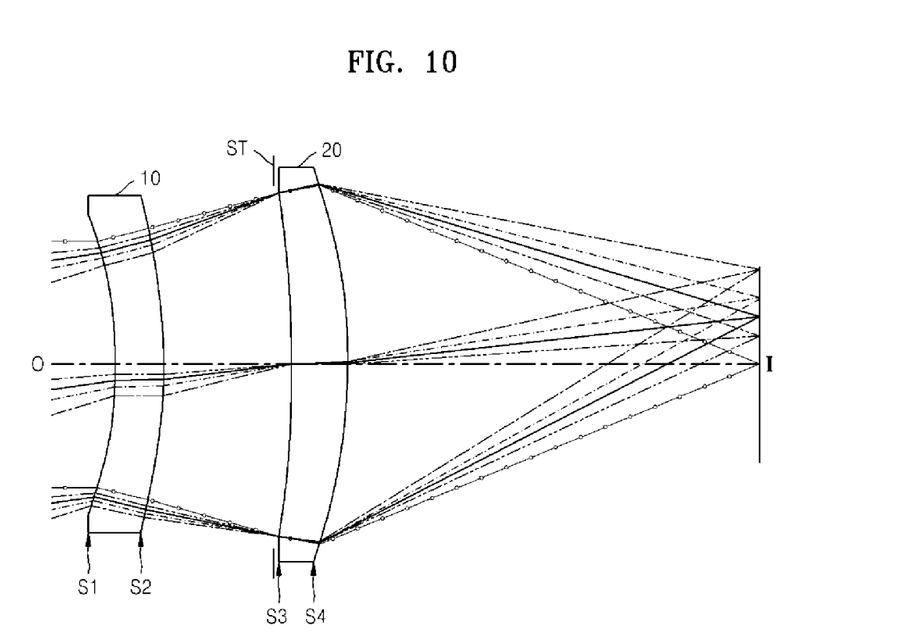
FIG. 10 is a schematic perspective view illustrating an infrared optical lens system according to another exemplary embodiment.

Table 7 shows design data of the infrared optical lens system according to the embodiment illustrated in FIG. 10, and Table 8 shows aspheric coefficients of the infrared optical lens system illustrated in FIG. 10. In the current embodiment, the first lens 10 is a negative meniscus lens having a convex surface facing an image I, and the second lens 20 is a positive meniscus lens having a convex surface facing the image I.

EFL=19.991
BFL=27.25
Fno=1.4
FOV=31.82°

TABLE 7

| # | R | Dn | material |
|---|---|---|---|
| S1 | −17.6041 | 3 | germanium |
| S2 | −23.3193 | 6.82 | air |
| S3 as stop | −71.4226 | 3.5 | germanium |
| S4 | −31.3716 | 27 | air |

TABLE 8

| # | $a_4$ | $a_6$ | $a_8$ | $a_{10}$ | $a_{12}$ |
|---|---|---|---|---|---|
| S2 | 1.5291e−004 | 3.2185e−007 | 2.8126e−010 | 0 | 0 |
| S3 | 2.0349e−006 | −5.0563e−008 | 9.6752e−012 | 0 | 0 |

FIGS. 11A through 11C and 12A through 12E illustrate aberrations of the infrared optical lens system illustrated in FIG. 10.

Figure 11A:
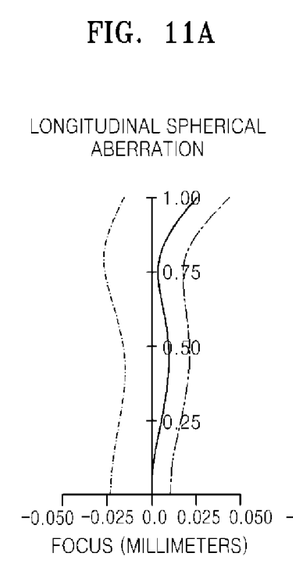
FIGS. 11A through 11C illustrate longitudinal spherical aberration, astigmatism, and distortion of the infrared optical lens system of FIG. 10, according to exemplary embodiments.
Figure 11B:
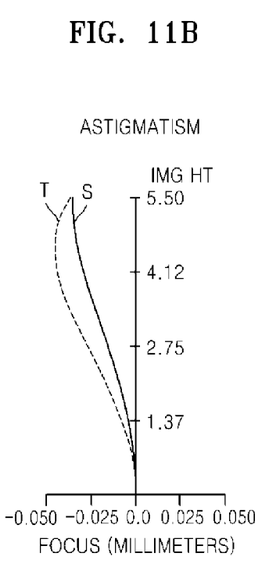
Figure 11C:
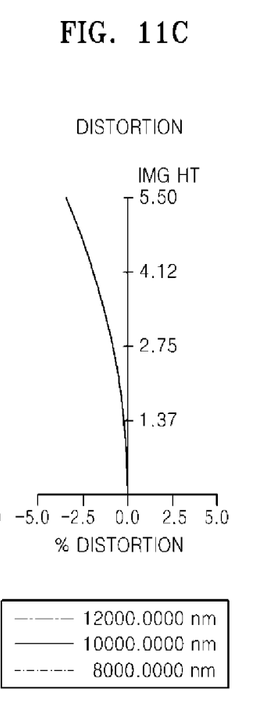
Figure 12A:
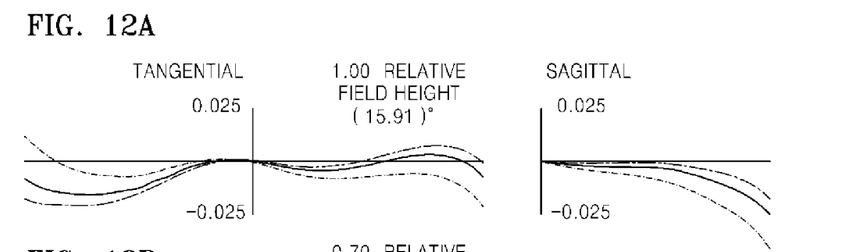
FIGS. 12A through 12E illustrate comatic aberrations of fields of the infrared optical lens system illustrated in FIG. 10, according to exemplary embodiments.
Figure 12B:
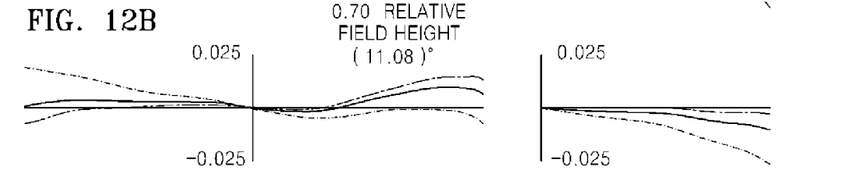
Figure 12C:
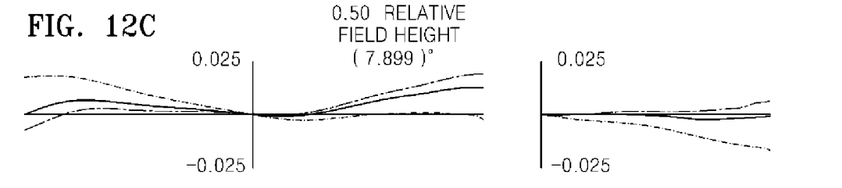
Figure 12D:
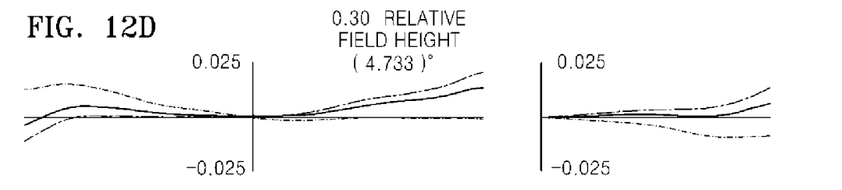
Figure 12E:
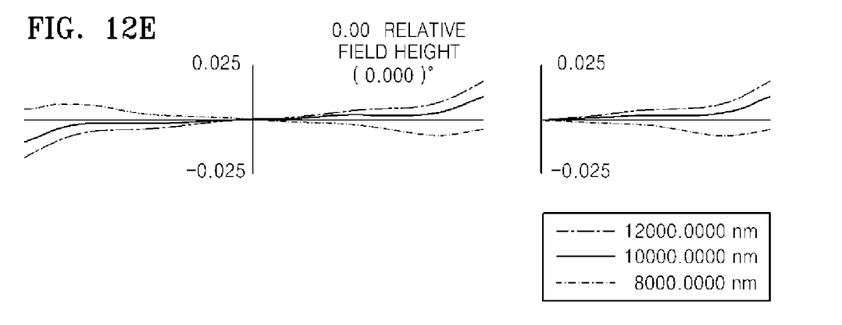

FIGS. 11A through 11C illustrate longitudinal spherical aberration, astigmatism, and distortion of the infrared optical lens system of FIG. 10. In an astigmatic field curve, a dotted line denotes tangential astigmatic aberration, and a solid line denotes sagittal astigmatic aberration.

FIGS. 12A through 12E illustrate comatic aberrations of fields of the infrared optical lens system illustrated in FIG. 1, from a center (0 field) to a periphery (1 field) of an image sensor. In each of FIGS. 12A through 12E, a left graph shows tangential comatic aberration, and a right graph shows sagittal comatic aberration. The comatic aberrations correspond to when angles of light incident on the infrared optical lens system are 15.91°, 11.08°, 7.899°, 4.733°, and 0°.

Meanwhile, the aberrations illustrated in FIG. 11A and FIGS. 12A through 12E correspond to when wavelengths are 12000 nm, 10000 nm, and 8000 nm, and the aberrations illustrated in FIGS. 11B and 11C correspond to when a wavelength is 10000 nm.

According to the embodiments of the present invention, high performance infrared optical lens systems having a wide angle and a high luminance and with which aberrations can be easily corrected are provided. Also, by setting a long back focal length, a sufficient space for installing a shutter may be provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An infrared imaging optical lens system comprising:
   a first lens having negative refractive power and being formed of a material comprising germanium; and
   a second lens having positive refractive power and being formed of a material comprising germanium,
   wherein the first lens and the second lens are disposed in this order from an object side to an image side,
   wherein the total number of lenses of the infrared imaging optical lens system is two,
   wherein lights incident on the first lens at specific angles are collected at a point of an image sensor,
   wherein each of the first lens and the second lens has a convex surface facing the image side, and
   wherein a back focal length of the infrared optical lens system is equal to or greater than 20 mm.

2. The infrared imaging optical lens system of claim 1, wherein at least two aspheric surfaces are provided on at least one of the first lens and the second lens.

3. The infrared imaging optical lens system of claim 1, wherein the first lens comprises at least one aspheric surface, and the second lens comprises at least one aspheric surface.

4. The infrared imaging optical lens system of claim 1, wherein the first lens comprises one aspheric surface, and the second lens comprises one aspheric surface.

5. The infrared imaging optical lens system of claim 4, wherein a surface of the first lens facing the image side and a surface of the second lens facing the object side are aspheric surfaces.

6. The infrared imaging optical lens system of claim 1, wherein the infrared imaging optical lens system includes only one aspheric surface provided on one of the first lens or the second lens.

7. The infrared imaging optical lens system of claim 6, wherein a surface of the first lens facing the image side is an aspheric surface.

8. The infrared imaging optical lens system of claim 1, wherein an effective focal length of the infrared optical lens system is 20 mm or less.

9. The infrared imaging optical lens system of claim 1, wherein the effective focal length of the infrared optical lens system is 14 mm or less.

10. The infrared imaging optical lens system of claim 1, wherein an F-number of the infrared optical lens system is 1.4 or less.

11. The infrared imaging optical lens system of claim 1, wherein a field of view of the infrared optical lens system is 30° or greater.

12. The infrared imaging optical lens system of claim 1, wherein the field of view of the infrared optical lens system is 40° or greater.

13. The infrared imaging optical lens system of claim 1, wherein the first lens is a negative meniscus.

14. The infrared imaging optical lens system of claim 1, wherein the second lens is a bi-convex lens.

15. The infrared imaging optical lens system of claim 1, wherein the second lens is a positive meniscus lens.

16. The infrared imaging optical lens system of claim 1, wherein the first lens and the second lens comprise a same material.

17. The infrared imaging optical lens system of claim 1, further comprising an aperture disposed between the first lens and the second lens.

* * * * *